(12) United States Patent  
Lynch (10) Patent No.: US 9,360,870 B2
(45) Date of Patent: Jun. 7, 2016

(54) DIGITAL PROPORTIONAL WIRELESS CONTROL

(71) Applicant: Lynch Fluid Controls Inc., Mississauga (CA)

(72) Inventor: Ernest Thomas Lynch, Toronto (CA)

(73) Assignee: Lynch Fluid Controls Inc., Mississauga, Ontario ( * ) Notice: Subject to any disclaimer, the term of this patent is extended or adjusted under 35 U.S.C. 154(b) by 267 days.

(21) Appl. No.: 13/945,428

(22) Filed: Jul. 18, 2013

(65) Prior Publication Data

US 2014/0021385 A1  Jan. 23, 2014

Related U.S. Application Data

(60) Provisional application No. 61/741,308, filed on Jul. 18, 2012.

(51) Int. Cl.
| | |
|---|---|
| *F16K 31/06* | (2006.01) |
| *G05D 7/06* | (2006.01) |
| *G05D 16/20* | (2006.01) |
| *F15B 21/08* | (2006.01) |

(52) U.S. Cl.
CPC ............ *G05D 7/0617* (2013.01); *F15B 21/085* (2013.01); *F16K 31/0675* (2013.01); *G05D 16/20* (2013.01); *G05D 16/2026* (2013.01)

(58) Field of Classification Search
CPC . F16K 31/00; F16K 31/0655; F16K 31/0675; F16K 37/0041; G05D 7/0617; G05D 16/20; G05D 16/2026; F15B 21/085
USPC .................................................... 251/129.04
See application file for complete search history.

(56) References Cited

U.S. PATENT DOCUMENTS

| | | |
|---|---|---|
| 5,703,750 A | 12/1997 | Kim et al. |
| 6,782,644 B2 | 8/2004 | Fujishima et al. |
| 7,070,161 B2 | 7/2006 | Piehl et al. |
| 7,389,968 B2 | 6/2008 | Katoh et al. |
| 7,503,342 B2 | 3/2009 | Piehl et al. |
| 8,843,241 B2 * | 9/2014 | Saberi et al. .................. 700/287 |
| 2005/0127314 A1 * | 6/2005 | Piehl et al. ............... 251/129.04 |
| 2006/0082469 A1 * | 4/2006 | Affaticati et al. ........ 340/870.07 |
| 2007/0215826 A1 * | 9/2007 | Katoh et al. ............. 251/129.04 |
| 2011/0121215 A1 * | 5/2011 | Cha et al. ................. 251/129.04 |
| 2014/0209825 A1 * | 7/2014 | Fick et al. ................ 251/129.04 |
| 2015/0097129 A1 * | 4/2015 | Ben-Ami ................. 251/129.04 |

OTHER PUBLICATIONS

James, J., "Structure of an HTTP request", TechRepublic, http://www.techrepublic.com/blog/programminng-and-development/structure-of-an-http-request/, May 25, 2011.

* cited by examiner

*Primary Examiner* — William McCalister
*Assistant Examiner* — Ian Paquette
(74) *Attorney, Agent, or Firm* — Bereskin & Parr LLP S.E.N.C.R.L., s.r.l.

(57) ABSTRACT

Various embodiments are described herein for a system for controlling fluid systems and for remotely controlling fluid control devices. In some described embodiments, the system includes at least one fluid control device, a proportional valve driver coupled to the at least one fluid control device, a wireless network, and at least one user controller device coupled to the proportional valve driver through the wireless network. In some described embodiments, the proportional valve driver comprises a wireless transceiver, a proportional translation unit, and a parameter unit. The proportional valve driver comprises a wireless transceiver operable to establish a communication channel with a user controller, receive a request signal, transmit the request signal to a processor for deconstruction and execution, and transmit a response signal.

20 Claims, 7 Drawing Sheets

DIGITAL PROPORTIONAL WIRELESS CONTROL

This application claims the benefit of U.S. Provisional Application No. 61/741,308 filed on Jul. 18, 2012, the complete disclosure of which is incorporated herein by reference.

FIELD

The various described embodiments herein generally relate to a system for controlling fluid systems, and in particular for remotely controlling fluid control devices.

BACKGROUND

Fluid power is used to generate, control, and transmit power in systems in various industries and applications, including aerospace, oil and gas, construction, medical, entertainment, logging, mining, and military. Fluid power can involve both the use of pressurized liquids or gases. Fluid power systems can include components such as manifolds and arrays of fluid control valves. Proportional valve drivers can be used to control fluids in fluid power systems.

To maintain optimum performance, conventional valve drivers need to be substantially near or on-board the fluid control valves or fluid power systems. Often times proportional valve drivers can be difficult and unsafe to access due to limitations including vertical placement, physical access restrictions, or harsh environmental conditions. Adjustments to existing proportional valve drivers also require physical adjustment or a communication cable connection to a specialized remote control device.

SUMMARY

In at least one embodiment described herein, there is provided a valve control system comprising at least one fluid control device, a proportional valve driver coupled to at least one fluid control device, wherein the proportional valve driver comprises a wireless transceiver, a proportional translation unit and a parameter unit, and wherein the wireless transceiver of the proportional valve driver enables transmitting at least one existing proportional valve driver parameter recorded in the parameter unit and receiving at least one new proportional valve driver parameter for recording in the parameter unit, a wireless network, and at least one user controller device coupled to the proportional valve driver through the wireless network for receiving the at least one existing proportional valve driver parameter and transmitting the at least one new proportional valve driver parameter.

In another aspect, in at least one embodiment described herein, there is provided a wireless transceiver of the proportional valve driver that is operable to establish a wireless communication channel with at least one user controller, receive at least one request signal from the at least one user controller, the request signal corresponding to parameters for the proportional valve driver, identify validity of the request signal, transmit the request signal to a processor of the proportional valve driver for deconstruction and execution, and transmit a data array comprising at least one response signal.

In another aspect, in at least one embodiment described herein, there is a request signal comprising a password, the password used to determine whether to allow transmission of the request signal to the proportional valve driver, at least one action request, the action request defines an operation for the proportional valve driver, and at least one action request value, the action request value corresponds to the operation for the proportional valve driver.

In another aspect, in at least one embodiment described herein, there is a response signal comprising a status signal, the status signal indicates whether the request signal operation was successful, at least one parameter name, the parameter name corresponds to a proportional valve driver parameter, and at least one parameter name value, the parameter name value corresponds to a parameter name.

In another aspect, in at least one embodiment described herein, there is a proportional valve driver further comprising a user controller interface unit, wherein the user controller interface unit may be connected to a specialized hardware remote controller by a physical connection.

In another aspect, in at least one embodiment described herein, there is a wireless transceiver of the proportional valve driver configured to communicate with more than one user controller device, wherein each of the more than one user controller device communicates through a unique wireless communication network standard.

Additional aspects and embodiments are described below.

BRIEF DESCRIPTION OF THE DRAWINGS

Several embodiments of the present invention will now be described in detail with reference to the drawings, in which.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. It will be appreciated that for simplicity and clarity of illustration, where considered appropriate, reference numerals may be repeated among the figures to indicate corresponding or analogous elements or steps.

DESCRIPTION OF EXEMPLARY EMBODIMENTS

The various embodiments described herein generally relate to a system for controlling fluid systems and for remotely controlling fluid control devices.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to herein as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Figure 1:
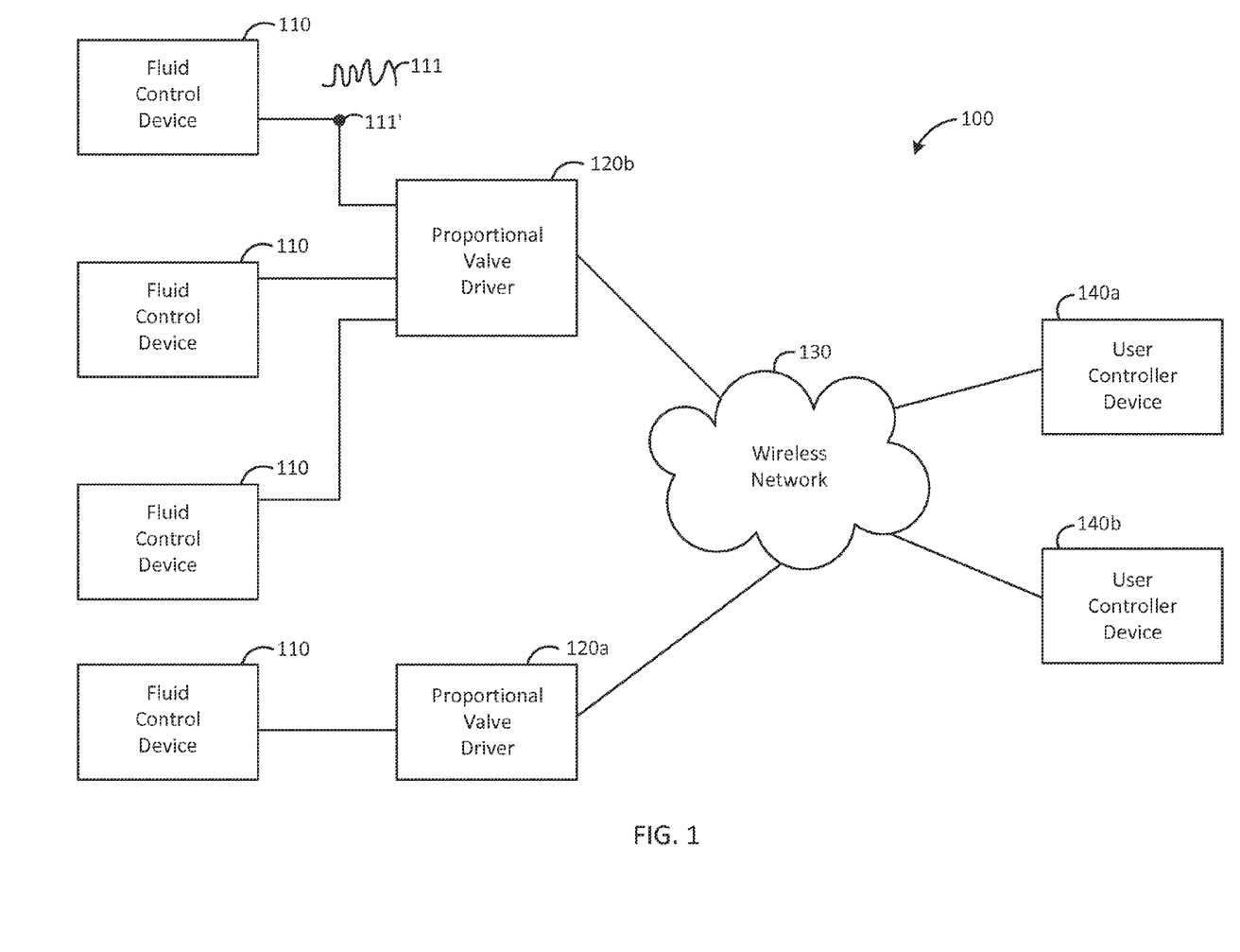
FIG. 1 is block diagram of valve control system components in accordance with an example embodiment.

Reference is first made to FIG. 1, which illustrates a block diagram of components interacting in a valve control system 100 in accordance with an example embodiment. Valve control system 100 can provide the means to generate, control, and transmit power using pressurized liquids or gases. Valve control system 100 can include manifolds in combination with any number of fluid control devices 110. It will be understood that although only four fluid control devices are illustrated in FIG. 1, the valve control system 100 may contain any number of fluid control devices 110 and the fluid control devices 110 can be connected in any configuration or arrangement.

Fluid control devices 110 can be coupled to proportional valve drivers 120. A proportional valve driver 120 can include the functionality of a current driver or controller, an electromagnetic actuator, or a signal processing device. As illustrated in FIG. 1, a proportional valve driver 120a can be coupled to a single fluid control device 110. A proportional valve driver 120b can also be coupled to more than one fluid control device 110 in any number of configurations. A proportional valve driver 120 can affect a valve assembly of a fluid control device 110 by opening and closing the flow path of fluids to create different flows or pressures in the valve control system 100. A proportional valve driver 120 can also affect fluid control device 110 operation parameters, including ramp up or down time, command signal deadband, dither frequency, and input or output signal ranges.

When a proportional valve driver 120b is coupled to more than one fluid control device 110, the proportional valve driver 120b may affect all fluid control devices in the same way. The proportional valve driver 120b may also allow unique adjustments to each individual fluid control device 110. For example, in a steel manufacturing environment, a proportional valve driver 120b can be coupled to four fluid control devices 110. Each fluid control device 110 can provide power to a successive stage on the steel manufacturing line. The proportional valve driver 120b may be able to provide temporally unique ramp up and ramp down times to each fluid control device 110 of the successive stages of the steel manufacturing process.

Proportional valve driver 120 can be monitored, adjusted, and controlled through physical components and inputs on the proportional valve driver 120. In some embodiments, a potentiometer can drive an input command signal.

Proportional valve driver 120 can include a wireless transceiver unit capable of transmitting and receiving wireless signals. In some embodiments, proportional valve driver 120 can receive new parameters from a user controller device 140 for setting up and adjusting fluid control devices 110. Proportional valve driver 120 can also transmit wireless signals to a general user computing device 140. The transmitted wireless signals may include response or status information based upon the present state of an open or closed valve in a fluid control device 110.

A user controller device 140 may include any computing device with at least a processor and memory and be capable of receiving, transmitting, and processing instructions. The user controller device 140 may be an electronic tablet device, a personal computer, a workstation, a sever, a portable computer, a mobile device, a personal digital assistant, a laptop, a smart phone, a WAP phone, an interactive television, and video display terminals or any combination of these capable of interacting wirelessly with wireless network 130. It will be understood that although only two user controller devices 140 are illustrated in FIG. 1, any number and any type of user controller devices 140 may interact with the valve control system 100 through wireless network 130. A user controller device need not be assigned to any particular proportional valve driver 120 or fluid control device 110, but may communicate with any and all fluid control devices 110 at any given time.

Wireless network 130 can include any network capable of wirelessly transmitting data between any proportional valve driver 120 and any user controller device 140. Wireless network 130 can include one or more wireless communication networks, such as wireless local area network (WLAN), wireless wide area network, a network implemented using Bluetooth technology or infrared light, and any other wireless networks implemented using similar protocols and technologies. Wireless network 130 may also include multiple sub-networks.

Figure 2:
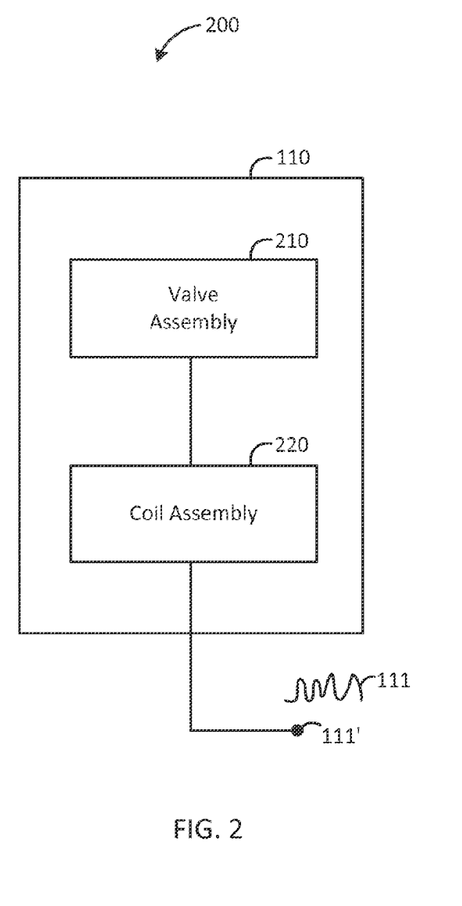
FIG. 2 is a block diagram schematic of a fluid control device in accordance with an example embodiment.

Reference is now made to FIG. 2, which illustrates a schematic block diagram of a fluid control device 110. In some embodiments, a fluid control device 110 can include a valve assembly 210 coupled to a coil assembly 220. A valve assembly 210 opens and closes the flow path of fluids of the fluid control device 110. The valve assembly 210 creates different flows or pressures required for a functioning valve control system 100. The degree of opening of a valve assembly 210 can be affected by magnetic fields produced by a coil assembly 220.

In some embodiments, when an electrical current is provided to a coil assembly 220 of a fluid control device 110, a magnetic field affects a valve assembly 210. The magnetic field alters the positioning of magnetic material within the valve assembly 210. The positioning of magnetic material within a valve assembly 210 can cause the valve to open and close the fluid flow path to create different flows or pressures required for running fluid control systems. In some examples, a coil assembly may be a solenoid.

Figure 3:
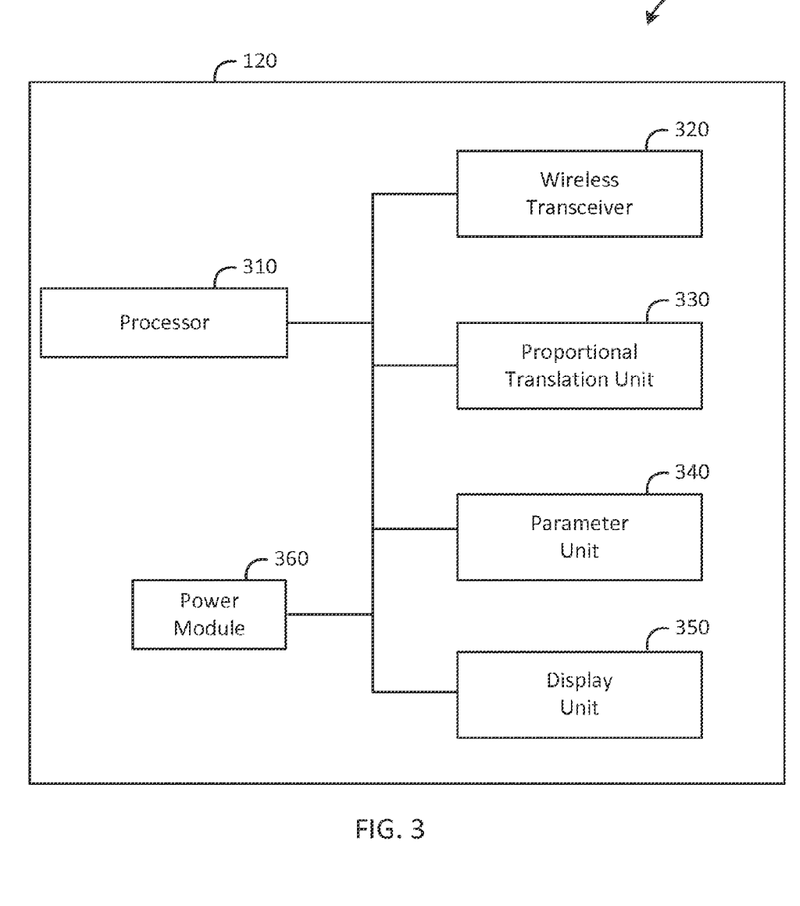
FIG. 3 is a block diagram schematic of a proportional valve driver in accordance with an example embodiment.

Reference is now made to FIG. 3, which illustrates a schematic block diagram of a proportional valve driver 120. Proportional valve driver 120 can include a processor 310, a wireless transceiver 320, a proportional translation unit 330, a parameter unit 340, and a display unit 350. In some embodiments, display unit 350 can include LED or LCD display components and provide real-time status information on the proportional valve driver 120. The display unit 350 can also display information relating to adjustment values or display error codes for troubleshooting the proportional valve driver 120.

A parameter unit 340 can store existing or default proportional valve driver 120 parameters, including parameters affecting maximum and minimum current output values, output signal ramp up and ramp down times, command signal deadband, dither frequency, and input signal types (e.g. input voltage ranges or input current ranges). The parameter unit 340 can also receive new parameters from a user controller device 140 that can replace existing or default proportional valve driver 120 parameters.

A proportional translation unit 330 can include circuits to translate, based upon parameters defined in a parameter unit 340, an input command voltage or current into an output current. The output current can be provided or coupled to a coil assembly 220. When a proportional valve driver 120 is coupled to a fluid control device 110, proportional translation unit 330 output can be provided to the fluid control device 110 where fluid flow or pressure is changed or controlled proportionally based on an input command voltage or current. It will be understood that the system 100 is not limited to control of fluid control devices 110. System 100 or proportional valve driver 120 may be implemented to affect any similar control devices in the same manner. For example, proportional valve driver 120 of system 100 may control an actuator, where the proportional valve driver 120 output current is coupled to and controls the operation of an actuator.

In some embodiments, the proportional translation unit 330 can affect an input command voltage or current through scaling, ramping, linearization, biasing, or analog-to-digital or digital-to-analog functions. As described above, the functions of the proportional translation unit 330 can be customized corresponding to parameters stored in the parameter unit 340.

A wireless transceiver 320 can include an integrated circuit compatible with wireless communication technology for communicating with user controller devices 140. Any wireless network 130, including a Bluetooth wireless communication network, wireless local area network (WLAN), wireless wide area network (WWAN), may be implemented to allow a wireless transceiver 320 of proportional valve driver 120 to communicate with a user controller device 140.

In some embodiments, wireless transceiver 320 can be capable of communicating with devices with different wireless communication capabilities. For example, wireless transceiver 320 may have integrated capabilities to simultaneously communicate with a user controller device 140 through a wireless local area network (WLAN), with another user controller device 140 through a cellular or LTE network, and further with another user controller device 140 through a Bluetooth wireless network.

The interoperability of the wireless transceiver 320 with multiple wireless communication capabilities provides a user with flexibility to access and control a proportional valve driver 120 without the conventional limitations inherent in utilizing specialized remote controller devices.

Figure 4:
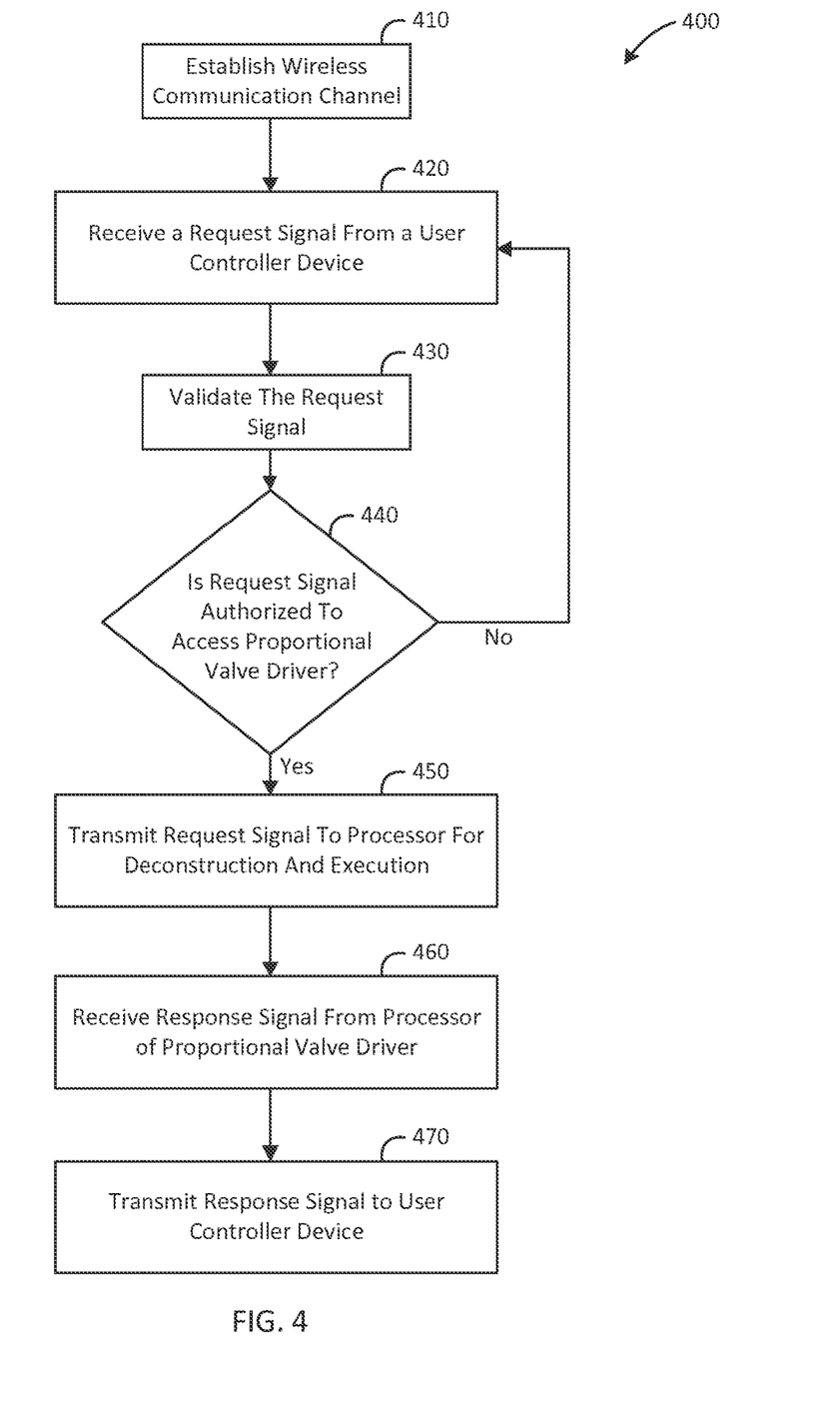
FIG. 4 is a flowchart illustrating the steps of wireless communications between a proportional valve driver and a user controller device.

Reference is now made to FIG. 4, which is a flow chart illustrating the steps of a wireless communication protocol. Method 400 facilitates communication between a proportional valve driver 120 and a general user computing device 140. The content of messages or signals may be plain readable text or may be encoded text.

At 410, wireless transceiver 320 of proportional valve driver 120 establishes a wireless communication connection with a user controller device 140. Wireless transceiver 320 may establish a wireless communication connection with one or more user controller devices. The wireless communication connection may not be limited to any particular wireless technology, but can include any wireless communication connection capable of transmitting and receiving data.

At 420, wireless transceiver 320 can receive a request signal from a user controller device 140. The request signal can include a password. For example, the password can be a password for authenticating a specific user controller device 140 to communicate with a proportional valve driver 120. Alternatively, the password can be a password for authenticating a user who may be using any user controller device 140 to communicate with a proportional valve driver 120. Further, the password can be a password for authenticating a user who may be using a specific controller device 140 to communicate with a proportional valve driver 120. It will be understood that the usage of a password will not be limited to any of the above described usage cases. Parameter unit 340 can store the settings relating password usage.

In some embodiments, the password may identify a specific proportional valve driver 140 amongst a plurality of proportional valve driver 140 device to which the request signal is to be sent.

Processor 310 of proportional valve driver 120 can validate the provided password and determine whether the user of the user controller device 140 may communicate with the proportional valve driver 120. In some embodiments, a proportional valve driver 120 may communicate with a general user computing device 140 for a limited or basic set of requests without a user password.

The request signal can also include the name of a parameter and a value that a general user computing device 140 would like to retrieve or modify. For example, wireless transceiver 320 can receive a request signal for retrieving a dither frequency of the proportional valve driver 120. In another example, wireless transceiver 320 may receive a request signal for setting up a new output signal ramp up time for a proportional valve driver 120. Wireless transceiver 320 of proportional valve driver 120 can receive a request signal that includes at least one action and at least one value relating to parameter values of the proportional valve driver 120.

The list of requested actions in a request signal may include additional complex actions for the proportional valve driver 120 to affect any fluid control device 110. For example, the sequence of setting up parameters and the timing of when the parameters should be set may be important and recorded in the request signal. It may be necessary for the maximum and minimum current output parameters to be setup before the ramp up and ramp down parameters are modified. The request signal shall not be limited to defining only individual parameter setup and individual parameter retrieve functions.

In some embodiments, the request signal may utilize the following format:

password<action:parameted¶meter2$ . . . parameterN>

The following is an example of a request signal received by wireless transceiver 320 of proportional valve driver 120:

p45rABre<set:
maxoutsig&2$rampup&10$&inputsigselec&10>.

In this example, "p45rABre" represents the provided password. The requested action is to set a parameter for the proportional valve driver 120. The requested action includes setting up parameters for a maximum output signal, a ramp up time, and an input signal type. Specifically, the maximum output current is being setup for 2 Amps, the ramp up time for the output signal to increase from minimum to maximum is 10 time units, and the input signal may be from 0 to 10 volts. It will be understood that the number of parameters included in the request signal can depend on the nature of the requested action from a general user computing device 140.

At 430, processor 310 of proportional valve driver 120 determines whether the password is a password that can enable a user controller device 140 to communicate with a proportional valve driver 120.

Where a processor 310 of proportional valve driver 120 determines that the provided password is not a password authorizing a user controller device 140 to communicate with the proportional valve driver 120, the processor 310 can discard the received request signal. Thereafter, the wireless transceiver 320 of proportional valve driver 120 can receive a subsequent request signal with another user password.

Where a processor 310 determines that the password is a password that can enable a user controller device 140 to communicate with a proportional valve driver 120, at 450, the processor 310 deconstructs the request signal. For example, where the request signal requests a specific ramp up time, the proportional translation unit 330 can execute the requested action. In another example, where the request signal includes an action to retrieve a present proportional valve driver 120 status, processor 310 can retrieve the requested status information.

At 460, once the proportional valve driver 120 finishes deconstructing and affecting change in accordance with the request signal, processor 310 can provide a response signal. In some embodiments, the response signal format can be as illustrated below:

status<name1:value1&name2:value2 . . . nameN:valueN>

In this example, a status indicates whether a requested action or request signal was successful. In some embodiments, a proportional valve driver 120 may not be able to execute an action as requested by a request signal. For example, if the action requested by a request signal is related to setting proportional valve driver 120 parameters that are out of allowable ranges, the action within the request signal will not be successfully performed. In this example, the action may fail and the status will indicate the action failure. Alternatively, the action may be performed and the status will indicate that an alternative result was achieved due to an invalid action request.

Continuing with the above request signal format example, a response signal may include a series of names and values. The number of names and values can be dependent on the operation performed on the proportional valve driver 120. For example, in the case of an error, information about an error can be represented by a response signal such as "error<code: 5&message:value out of range>."

At 470, the wireless transceiver 320 of proportional valve driver 120 can transmit a response signal to a user controller device 140 through wireless network 130.

The wireless communication protocol of method 400 can allow a wireless transceiver 320 of proportional valve driver 120 to communicate with any user controller device 140 connected through wireless network 130. Where the communication method 400 is common between a proportional valve driver 120 and a user controller device 140, the wireless communication method 400 is neither dependent on the specification, type, or model of proportional valve driver nor dependent on the specification, type, or model of general user computing device. A user no longer requires a specialized remote control device to troubleshoot, monitor, or adjust the proportional valve driver 140.

In some embodiments, request signals and response signals are designed to be deconstructed and executed by proportional valve driver 120 with minimal processor and memory resources.

Figure 5:
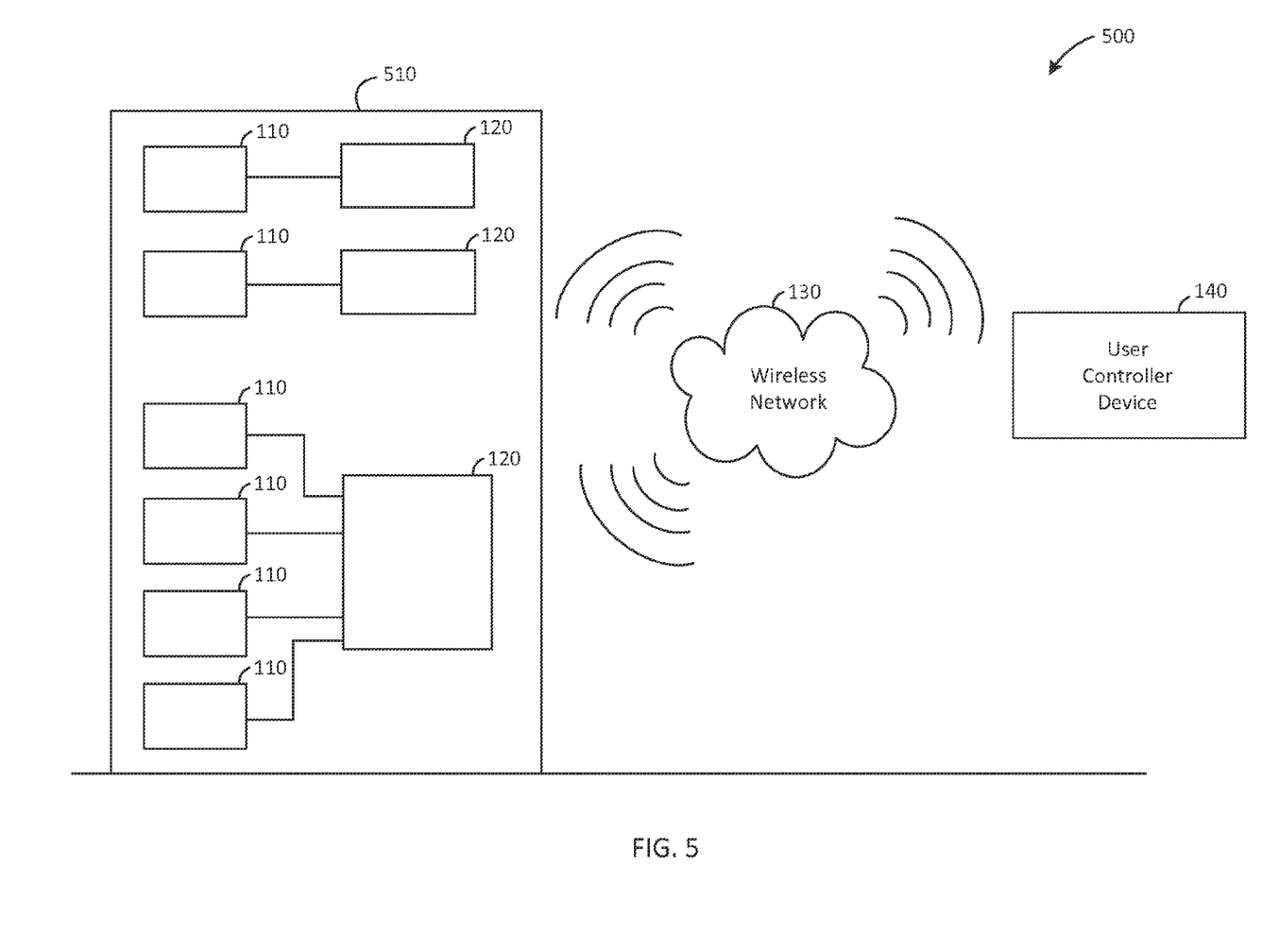
FIG. 5 is a block diagram of a manufacturing facility illustrating an application of valve control system components.

Reference is now made to FIG. 5, which illustrates a schematic block diagram of a valve control system 100 implemented in an example environment. A manufacturing facility 500 can include a product processing chamber 510 to initiate and control product processes. The product processing chamber 510 can include several arrays of fluid control devices 110 and proportional valve drivers 120 as part of components of a product processing chamber 510. Access to the product processing chamber 510 may be governed by safety procedures that restrict physical access during the operation of the product processing chamber 510. The fluid control devices 110 and proportional valve drivers 120 may be located within sub-components of the product processing chamber 510 and not easily accessible without disassembling the product processing chamber 510. In addition, access to a product processing chamber 510 may be governed by strict safety procedures restricting physical access at specific times. In addition, access to the product processing chamber 510 may only be permitted after the product processing chamber 510 is shut down, after a prescribed time period, and after any wastes have been contained.

Continuing with this example, the valve control system 100 can allow a user controller device 140 the ability to communicate with any of the proportional valve drivers 120 within product processing chamber 510 without needing to shut down product processing chamber 510. As an example, a user controller device 140 could wirelessly adjust the processing walls by communicating and modifying parameters of the proportional device driver 140. Allowing a user to remotely control proportional device drivers 140 within the product processing chamber 510 without physically touching the proportional valve driver 140 increases operator safety and convenience. More generally, a valve control system 100 may be used to provide wireless control for valves located in inhospitable, inaccessible or otherwise dangerous environments.

Figure 6:
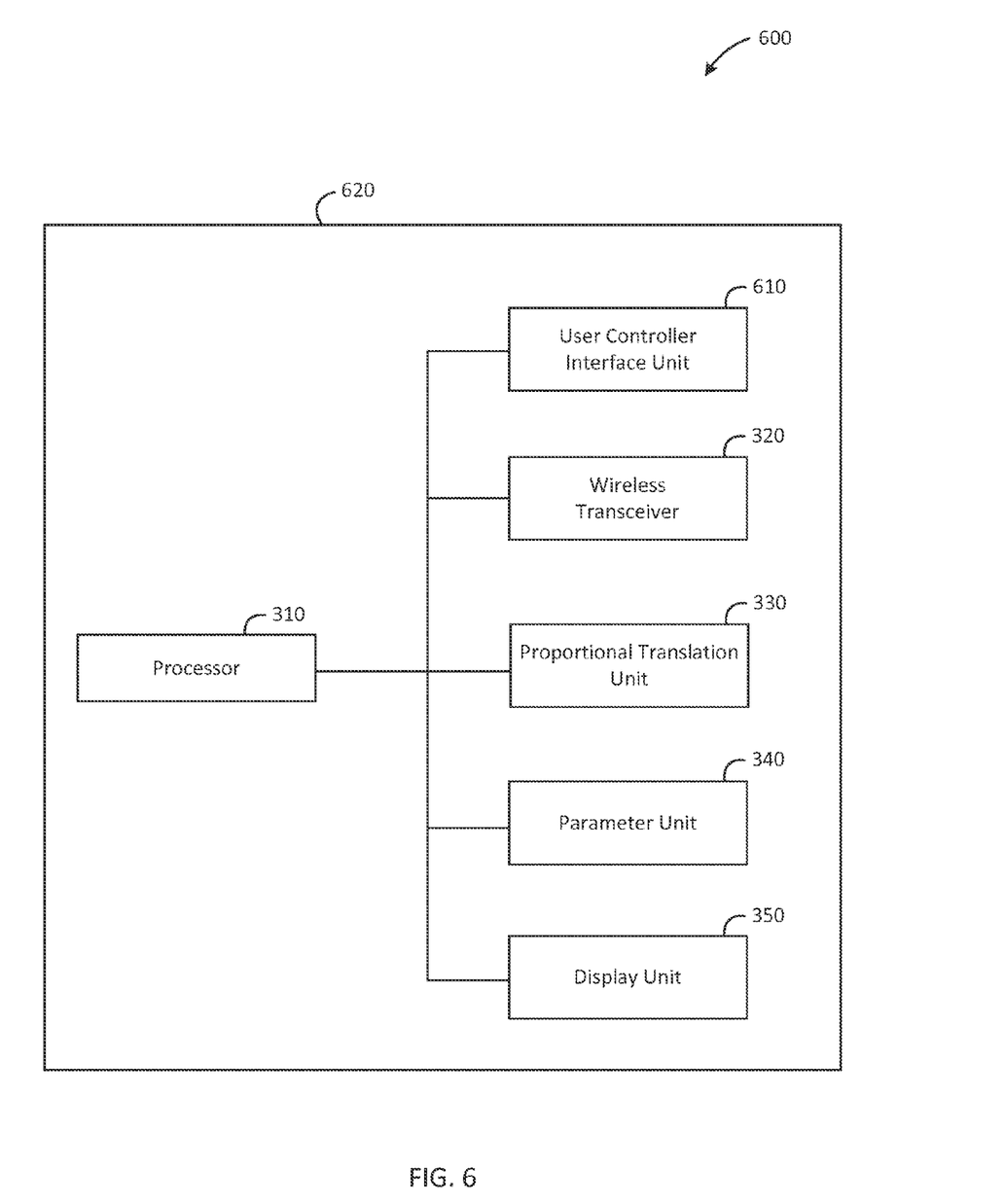
FIG. 6 is a block diagram schematic of a proportional valve driver in accordance with another example embodiment.

Reference is now made to FIG. 6, which illustrates a schematic block diagram of a proportional valve driver 120 in accordance with another embodiment. In addition to a processor 310, a wireless transceiver 320, a proportional translation unit 330, a parameter unit 340, and a display unit 350, proportional valve driver 620 can also include a user controller interface unit 610. A specialized hardware remote controller, for example, may physically be connected to a user controller interface unit 610 using a communication cable.

Proportional valve driver 620 may, for example, be applied in an undersea environment. Proportional valve drivers 620 may be implemented within emergency safety devices of a submarine vehicle. Under normal procedures, emergency safety devices may be deployed by actuators controlled by proportional valve drivers 620, where proportional valve drivers 620 are controlled with a specialized hard wired remote controller unit. In an emergency circumstance, however, a wireless transceiver 320 may facilitate a user controller device 140 to communicate with proportional driver 620, especially when the communication cable connecting the specialized hard wired remote controller unit is severed. More generally, a valve control system 100 may be used to provide duplicate or redundant control functionality for a proportional valve driver by providing a wireless control channel as a backup or alternative to a wired wireless or to another wireless control channel.

Equipment manufacturers may also find application for the valve control system 100. For example, equipment manufacturers designing proportional valve drivers 620 into helicopter haul-down systems may be able to design proportional valve drivers 620 into smaller size packages. By removing undesired components, such as the user controller interface unit 610, proportional valve drivers 120, 620 may be designed into smaller packages. Smaller physical designs may also enable equipment manufacturers in designing economically viable protective cases that are environmentally insulated or shielded to protect proportional valve drivers from high-pressure and harsh environmental conditions.

The valve control system 100 may find application for debugging and telemetry purposes. User controller device 140 may alter proportional valve driver 120 parameters in real-time and observe changes to behavior of an array of valve control devices 110. Connection of additional components to the valve control system 100 for debugging may be avoided. For example, it may be unnecessary to connect data acquisition units to a valve control system 100 during system test as a user controller device 140 may be configured to display and store proportional valve driver 120 parameters and response signals for analysis. In another example, it may be unnecessary to connect physical command signal inputs. User controller device 140 may be able to provide an array of command signal inputs for debugging purposes.

Figure 7:
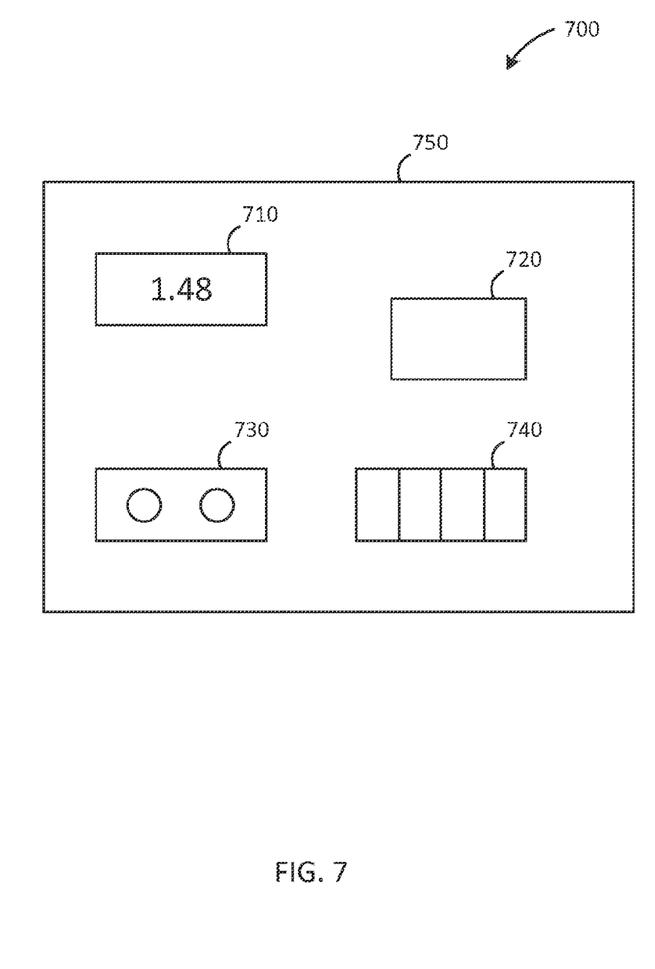
FIG. 7 is an illustration of a physical user interface on a proportional valve driver in accordance with an example embodiment.

Reference is now made to FIG. 7, which is an example interface of physical components and inputs on a proportional valve driver 120. For example, the user interface of physical components and inputs on a proportional valve driver 120 includes a display 710, push buttons 730, and physical inputs 740. The display 710 may be LED display components for displaying setting names, codes, and values. Push buttons 730 may be used to toggle between functions or setting names. Physical inputs 740 may be used to provide command input signals to the proportional valve driver 120. In some embodiments, a potentiometer or encoder may be connected to the physical inputs 740. In other embodiments, switches may be connected to the physical inputs 740.

Figure 8:
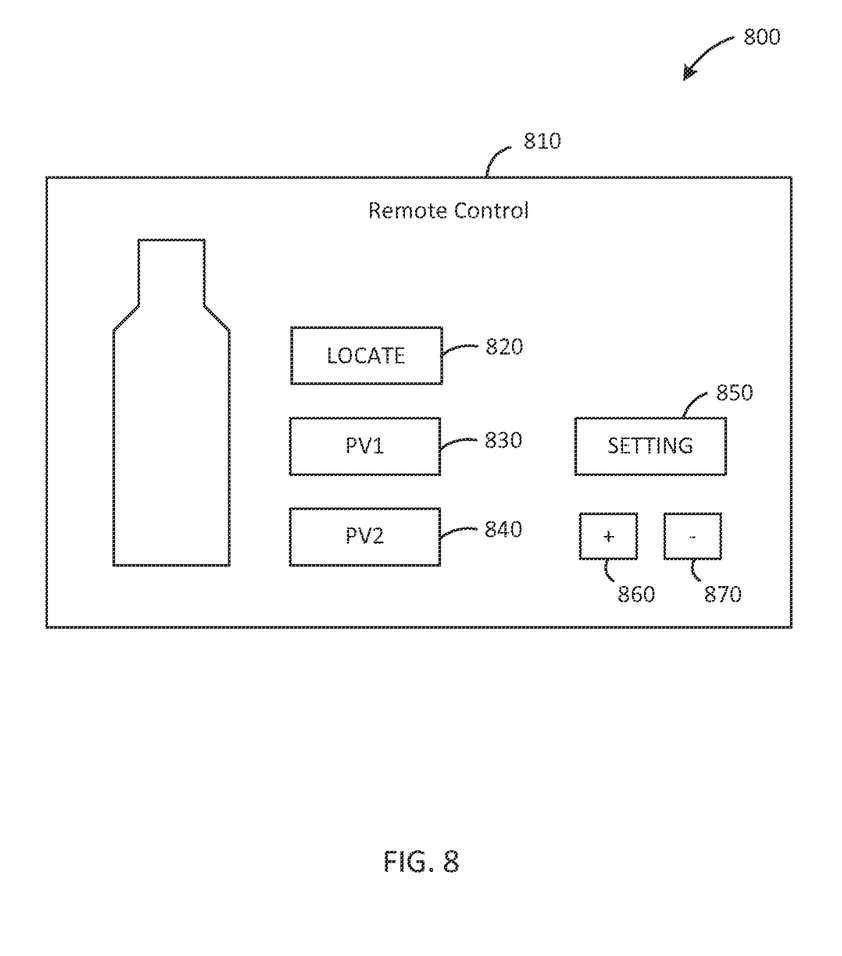
FIG. 8 is a screenshot of a user interface on a user controller device in accordance with an example embodiment.

Reference is now made to FIG. 8, which is an example user interface 810 viewable on a user controller device 140. The user interface 810 can include user selectable icons 820, 830, 840 for selecting and locating specific proportional valve drivers 120. In addition, the user interface can include user selectable icons 850, 860, and 870 for toggling settings or parameters and for modifying the settings or parameters.

The present invention has been described here by way of example only. Various modification and variations may be made to these exemplary embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

I claim:

1. A valve control system comprising:
at least one fluid control device;
a proportional valve driver coupled to the at least one fluid control device, the proportional valve driver comprising a first wireless transceiver, a parameter unit storing a plurality of proportional valve driver parameters defining operating parameters of the at least one fluid control device, and a proportional translation unit configured to translate an input command signal received by the proportional valve driver to an output signal that is coupled to the at least one fluid control device to cause the at least one fluid control device to perform an operation, the translation performed using the plurality of proportional valve driver parameters stored in the parameter unit; and
a controller device having a user interface and a second wireless transceiver, the second wireless transceiver configured to establish a wireless communication channel with the first wireless transceiver of the proportional valve driver;
wherein
the controller device is configured to transmit an authentication signal to the proportional valve driver;
the proportional valve driver is configured to validate the authentication signal enabling modification of the existing proportional valve driver parameters by a user of the controller device and to transmit at least one of the existing proportional valve driver parameters recorded in the parameter unit to the controller device;
the controller device is configured to display the at least one existing proportional valve driver parameter using the user interface, receive input from the user interface indicating at least one modification to the existing proportional valve driver parameters and transmit the at least one modified proportional valve driver parameter to the proportional valve driver; and
the proportional valve driver is further configured to receive the at least one modified proportional valve driver parameter and update the plurality of proportional valve driver parameters stored in the parameter unit using the at least one modified proportional valve driver parameter to generate a plurality of updated proportional valve driver parameters.

2. The valve control system of claim 1, wherein the parameters of the parameter unit comprise values corresponding to maximum and minimum current output, output signal ramp up and ramp down times, command signal deadband, dither frequency, and input signal types.

3. The valve control system of claim 1, wherein the proportional translation unit of the proportional valve driver translates the input command signal to the output signal using at least one of scaling, ramping, linearization, biasing, and analog to digital conversion.

4. The valve control system of claim 1, wherein the proportional valve driver further comprises a status display unit providing status information on the proportional valve driver substantially in real-time.

5. The valve control system of claim 1, wherein the communication channel is established using a Bluetooth communication protocol.

6. The valve control system of claim 1, wherein the communication channel is one of a wireless local area network (WLAN) and a wireless wide area network.

7. The valve control system of claim 1, wherein:
the proportional valve driver is configured to communicate with a plurality of user controller devices including the user controller device using an independently established wireless communication channel for each device.

8. The valve control system of claim 1, wherein:
the proportional valve driver is configured to communicate with a plurality of user controller devices including the user controller device; and
each of the user controller devices communicates through a unique wireless communication network standard.

9. The valve control system of claim 1, wherein the at least one fluid control device is an actuator.

10. The valve control system of claim 1, wherein the proportional valve driver further comprises an interface unit that is connectable to a specialized hardware remote controller by a physical connection.

11. The valve control system of claim 1, wherein:
the proportional valve driver is further configured to transmit a data array comprising at least one response signal to the controller device; and
the controller device is configured to display the at least one response signal on the user interface.

12. The valve control system of claim 11, wherein the response signal comprises:
a modification status signal indicating whether the modifications to the existing proportional valve driver parameters were successful; and
at least one parameter value, each parameter value corresponding to one of the updated proportional valve driver parameters.

13. The valve control system of claim 1, wherein upon receipt of an invalid authentication signal, the proportional valve driver is configured to prevent modification of the stored proportional valve driver parameters by the user controller device and to transmit an error message to the controller device.

14. The valve control system of claim 13, wherein the proportional valve driver is configured to transmit the at least one of the existing proportional valve driver parameters to the controller device only upon validation of the authentication signal.

15. The valve control system of claim 1, wherein the at least one fluid control device comprises a valve assembly and a coil assembly.

16. The valve control system of claim 15, wherein the proportional valve driver provides the output signal to the coil assembly.

17. A system for remotely configuring a plurality of fluid control devices, the system comprising:
a plurality of proportional valve drivers coupled to the plurality of fluid control device, each proportional valve driver coupled to at least one of the fluid control devices and each proportional valve driver comprising a first wireless transceiver, a parameter unit storing a plurality of proportional valve driver parameters defining operating parameters of the at least one fluid control device to which that proportional valve driver is coupled, and a proportional translation unit configured to translate an input command signal received by the proportional valve driver to an output signal that is coupled to one of the fluid control devices to cause that fluid control device to perform an operation, the translation performed using the plurality of proportional valve driver parameters stored in the parameter unit; and
a controller device having a user interface and a second wireless transceiver, the second wireless transceiver configured to establish a wireless communication channel with the first wireless transceiver of each proportional valve driver;
wherein for each proportional valve driver, upon establishing the wireless communication channel between the controller device and a particular one of the proportional valve drivers
the controller device is configured to transmit an authentication signal to the particular proportional valve driver;
the particular proportional valve driver is configured to validate the authentication signal enabling modification of the existing proportional valve driver parameters of that particular proportional valve driver by a user of the controller device and to transmit at least one of the existing proportional valve driver parameters recorded in the parameter unit of that particular proportional valve driver to the controller device;
the controller device is configured to display the at least one existing proportional valve driver parameter using the user interface, receive input from the user interface indicating at least one modification to the existing proportional valve driver parameters and transmit the at least one modified proportional valve driver parameter to the particular proportional valve driver; and
the particular proportional valve driver is further configured to receive the at least one modified proportional valve driver parameter and update the plurality of proportional valve driver parameters stored in the parameter unit of that particular proportional valve driver using the at least one modified proportional valve driver parameter to generate a plurality of updated proportional valve driver parameters; and
further wherein the authentication signal sent by the controller device to each one of the proportional valve drivers corresponds uniquely to that one of the proportional valve drivers.

18. A method for remotely configuring a fluid control device coupled to a proportional valve driver, the proportional valve driver storing a plurality of proportional valve driver parameters defining operating parameters of the fluid control device, the method comprising:

providing a controller device having a user interface and a wireless transceiver for remotely communicating with a corresponding transceiver of the proportional valve driver;

establishing a wireless communication channel between the controller device and the proportional valve driver;

receiving input including an authentication signal from the user interface;

transmitting the authentication signal to the proportional valve driver, the proportional valve driver configured to validate the authentication signal and thereby enable modification of the proportional valve driver parameters by a user of the controller device;

receiving at the controller device at least one of the existing proportional valve driver parameters stored on the proportional valve driver;

displaying the at least one existing proportional valve driver parameter on the user interface of the controller device;

receiving user input from the user input interface, the user input including indicating at least one modification to the existing proportional valve driver parameters;

transmitting the at least one modified proportional valve driver parameter to the proportional valve driver, wherein the proportional valve driver is further configured to update the plurality of existing proportional valve driver parameters using the at least one modified proportional valve driver parameter to generate a plurality of updated proportional valve driver parameters; and receiving at the controller device a response signal including a modification status signal indicating whether the modifications to the existing proportional valve driver parameters were successful and at least one parameter value, each parameter value corresponding to one of the updated proportional valve driver parameters.

19. The method of claim 18, wherein upon receipt of an invalid authentication signal, the proportional valve driver is configured to prevent modification of the stored proportional valve driver parameters by the controller device and to transmit an error message to the controller device.

20. The method of claim 19, wherein the proportional valve driver is configured to transmit the at least one of the existing proportional valve driver parameters to the controller device only upon validation of the authentication signal.

* * * * *